250-395 SR
9/2/86 OR H 000,116

United States Statutory Invention Registration [19]

[11] Reg. Number: H116

Palmer [45] Published: Sep. 2, 1986

[54] CHARGED PARTICLE ACCELERATOR GRATING

[75] Inventor: Robert B. Palmer, Shoreham, N.Y.

[73] Assignee: The United States of America as represented by the United States Department of Energy, Washington, D.C.

[21] Appl. No.: 773,755

[22] Filed: Sep. 9, 1985

[51] Int. Cl.[4] ..... H01J 3/14; H01J 3/26

[52] U.S. Cl. ..... 250/396 R; 250/423 P

[56] References Cited

PUBLICATIONS

R. B. Palmer, "A Laser-Driven Grating Linac", *Particle Accelerators,* vol. 11, pp. 81-90, 1980.

R. B. Palmer, "A Laser-Driven Grating Linac," Brookhaven National Laboratory, publication No. BNL32531, 1982.

*Primary Examiner*—Stephen C. Buczinski
*Assistant Examiner*—Linda J. Wallace
*Attorney, Agent, or Firm*—Vale P. Myles; Paul A. Gottlieb; Judson R. Hightower

[57] ABSTRACT

A readily disposable and replaceable accelerator grating for a relativistic particle accelerator. The grating is formed for a plurality of liquid droplets that are directed in precisely positioned jet streams to periodically dispose rows of droplets along the borders of a predetermined particle beam path. A plurality of lasers are used to direct laser beams into the droplets, at predetermined angles, thereby to excite the droplets to support electromagnetic accelerating resonances on their surfaces. Those resonances operate to accelerate and focus particles moving along the beam path. As the droplets are distorted or destroyed by the incoming radiation, they are replaced at a predetermined frequency by other droplets supplied through the jet streams.

18 Claims, 10 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CHARGED PARTICLE ACCELERATOR GRATING

The U.S. Government has rights in this invention pursuant to Contract Number DE-AC02-76CH00016, between the U.S. Department of Energy and Associated Universities Inc.

The present invention relates to a grating apparatus for a charged particle beam accelerator and, more particularly, relates to an accelerator grating apparatus that is formed of a plurality of disposable liquid spheres, or droplets, that are excited by laser beams to cause their surfaces to support an electromagnetic resonance thereon for effectively accelerating charged particles along a predetermined accelerator beam path.

BACKGROUND AND GENERAL DESCRIPTION

Those familiar with the design and operation of linear accelerators, or linacs, of the types now commonly used to either accelerate, decelerate or focus beams made up of relativistic particles, such as electrons, protons, etc., understand that in order to perform such desired functions, any linac structure must convert incoming radiation into slow resonances or so called modes, because only such slow modes contain longitudal electric fields that can efficiently couple energy to the relativistic particles. In order to accomplish such a conversion, a linac structure must either contain a dielectric, or the structure must be made periodic in form. The simplest such periodic structure is a simple grating.

As early as the year 1953 it was conclusively demonstrated that when particles travel over the surface of a grating, light is emitted. In view of that demonstrated fact, it seemed reasonable that the inverse of that effect could be used to make an accelerator structure for accelerating particles over the surface of a grating. By the year 1968, in an article entitled, "Laser Linac with Grating", published by Messrs. Y. Takeda and I. Matsui, in *Nuclear Instrumentation Methods,* Vol. 62, pp. 306, they proposed a structure geometry for such an accelerator grating. However, in 1975 it was proved that that specific proposed geometry for a grating would not operate as intended for accelerating relativistic particles. During the year 1980, the inventor of the invention disclosed herein showed that it was only for the particular grating geometry proposed by Takeda and Matsui that relativistic particles could not be accelerated. He further demonstrated that for skewed or otherwise more three dimensional grating geometries, the desired acceleration of relativistic particles could, in fact, be obtained. A discussion and mathematical demonstration of such an operable grating structure was described by the present inventor in an article entitled, "A Laser-Driven Grating Linac", published in *Particle Accelerators* Vol. 11, pp. 81–99 (1980). In that article it is further shown that if an accelerator grating is given a periodicity equal to one-half the wavelength of the resonance-exciting radiation applied to the grating, it will act as a true resonance "cavity" of the type which supports electromagnetic resonances that include electric components in the direction of desired relativistic particle acceleration or motion. Of course, such a grating structure is relatively open, rather than actually being like a conventional cavity or enclosed transmission line of the types wherein particles to be accelerated are passed along the axis of the enclosure.

It was shown in the above-noted article, published during 1980 by the present inventor, that such an appropriately excited accelerator grating for a linac would have particle accelerating modes that were restricted to the surface of the grating and would not radiate energy away from that surface. FIG. 1 herein illustrates such a periodic accelerator grating structure that is excited by incoming radiation having a wavelength lambda. The grating structure 1 includes a plurality of semi-cylindrical portions 2–6 that cause the accelerating modes (designated by the dashed arrows 7) to be restricted to the surface, in the manner depicted in FIG. 1. Such surface fields are known to be composed of four slow "evanescent" waves that cross the grating surface diagonally. The directions of movement of such evanescent waves are illustrated in FIG. 2, where a grating surface 1' is shown schematically as being flat, with four arrows 8–11 thereon to indicate the directions of motion of the evanescent waves. As in FIG. 1, dash arrows 7 are used in FIG. 2 to designate the accelerating modes, which are restricted to the grating surface. The present inventor explained in the above-referenced 1980 article, that the interference pattern resulting from the movement of evanescent waves across such an accelerator grating surface provides fields that are periodic not only in a desired particle beam accelerating direction, but also transverse to that desired beam direction. Accordingly, acceleration of charged particles introduced into such fields occurs within a sequence of channels across the grating surface.

It is also well known that in order to excite such surface fields with incoming radiation, some interruption in the half-lambda periodicity of the grating surface must be introduced. One example of such a modified accelerator grating surface 12 is shown in FIG. 3. That surface has three semicylindrical portions 12A, 12B and 12C, between which two smaller semi-cylindrical portions 13A and 13B are arranged to appropriately modify the half-lambda periodicity of the overall grating structure. The incoming radiation, designated schematically by the arrowed lines 14 and 15, is then impacted onto the grating as two interfering plane waves that come down on the grating surface on either side of the vertical (shown by dashed line 16).

Such known types of accelerator grating structures pose a number of significant difficulties. For example, it is known that the accelerating field for such grating structures must inevitably extend over the entire grating surface; accordingly, walls or some other suitable means are needed to appropriately confine the field to a desirably narrow strip. In addition, any solid structure used to form such an accelerating grating will be rapidly worn away by the high energy particles moving across its surface. Thus, it would be desirable to invent some means for successfully generating a grating from disposable material that could be readily and efficiently renewed without impairing the desired accelerating, decelerating or focusing functions. The invention disclosed herein provides novel solutions to both of those major problems.

OBJECTS OF THE INVENTION

It is a primary object of the invention to provide an accelerator grating apparatus formed of readily disposable and replaceable liquid droplets that can support a high-gradient electro-magnetic resonance for accelerating, decelerating or focusing charged relativistic particles.

Another object of the invention is to provide a particle accelerator grating formed of precisely positioned jet streams of liquid droplets.

A further object of the invention is to provide a readily disposable and replaceable accelerator grating structure that can be excited with laser energy to support electromagnetic accelerating resonances on its surface.

Still another object of the invention is to provide means for forming an accelerator grating structure that can be efficiently excited by laser radiation to accelerate, decelerate or focus relativistic particles moving along a predetermined particle beam path.

Further objects and advantages of the invention will become apparent to those skilled in the art from the description of it presented herein, considered in conjunction with the accompanied drawings.

SUMMARY OF THE INVENTION

In one preferred embodiment of the invention a charged particle accelerator grating structue is formed by directing a plurality of precisely spaced jet streams of liquid droplets in planar arrays that border a predetermined particle beam accelerating path. A plurality of lasers are directed to impact laser beams at a predetermined angle onto the surfaces of the droplets bordering the beam path, thereby exciting the droplets to support electromagnetic resonances on their surfaces. Responsive to charged particles being introduced into the particle beam accelerating path, the electromagnetic resonances supported on the droplet surfaces operate to accelerate the particles along the beam path. The jet streams supplying droplets to their desired respective positions adjacent to the particle beam path are pulsed on demand, or otherwise are made to supply droplets to the jet streams at a predetermined frequency, thereby to readily and efficiently replace droplets that have been vaporized or destroyed in the performance of the accelerating function.

DESCRIPTION OF THE PREFERRED EMBODIMENT

Figure 1:
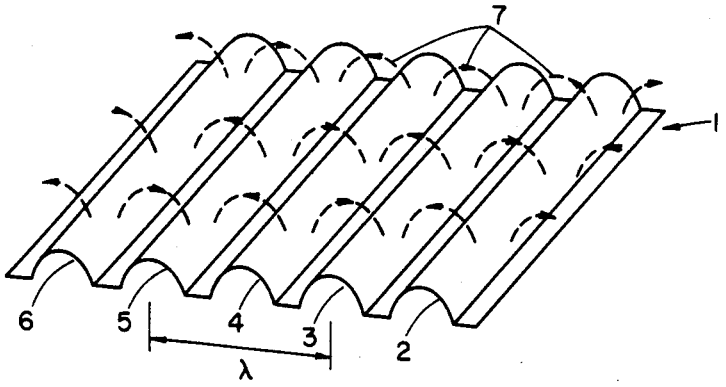
FIG. 1 is a schematic illustration of an accelerator grating structure having a periodic surface geometry corresponding to one wavelength (lambda) of an exciting radiation that may be applied to the surface in order to make it support electro-magnetic resonances thereon.
Figure 2:
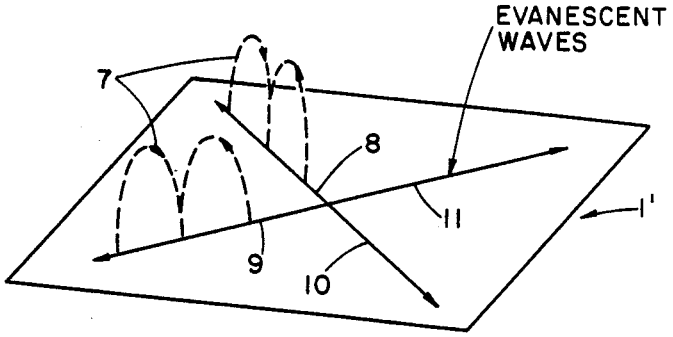
FIG. 2 is a schematic illustration of an accelerator grating surface showing the direction of movement of evanescent waves that would be produced thereon by incoming radiation impacting the surface.
Figure 3:
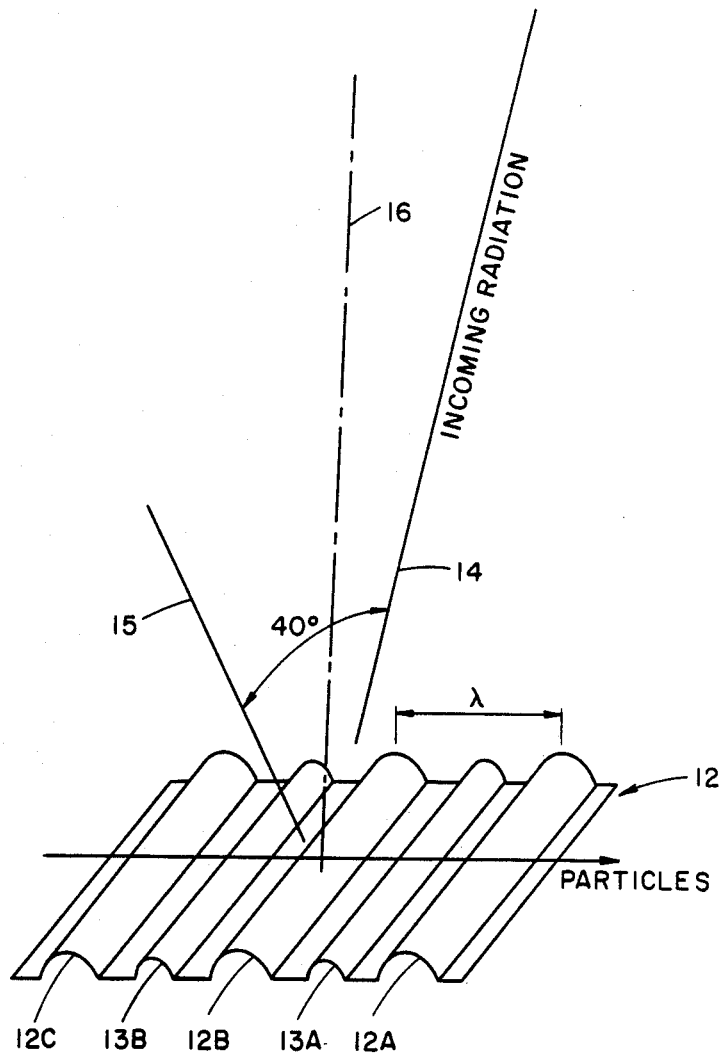
FIG. 3 is a schematic illustration of an accelerator grating structure that has had its periodic geometry modified to improve coupling between the grating surface and incoming radiation, which is designated by the arrows directed downward toward the surface at a predetermined angle with respect to an illustrated vertical to the surface.
Figure 4:
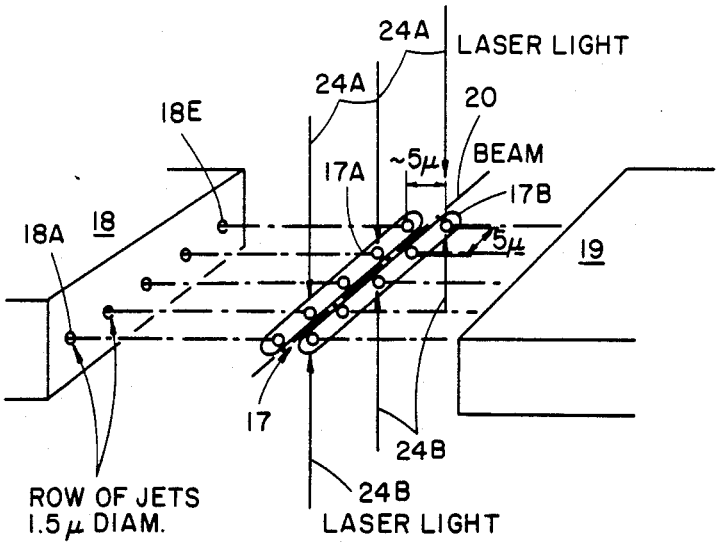
FIG. 4 is a schematic perspective view of a disposable and replaceable accelerator grating structure formed of a plurality of liquid droplets that are, respectively, supplied to the grating from jet stream producing assemblies positioned on opposite sides of the grating. Arrows are shown approaching the grating from both its upper and lower surfaces to schematically represent laser light that is used to excite the droplets to support electromagnetic resonances on their surfaces for accelerating particles along a predetermined particle beam path that is bordered by the droplets forming the grating.

Now that the general nature and principals of operation of some rigid types of accelerator grating structures have been described, with reference to FIGS. 1–3, a preferred embodiment of the invention will be described with reference to the remaining figures of the drawing. Referring first to FIG. 4, there is shown a long narrow accelerator grating 17 that is formed of two rows of liquid droplets that have been ejected in preselected paths from first and second jet forming means 18 and 19. As the description of the invention proceeds, it will be recognized that a variety of different suitable conventional jet forming means may be employed in practicing alternative embodiments or modifications of the invention. In the preferred embodiment being described, the jet forming means 18 and 19 comprise a plurality of ink-jet-printer-type jet forming means similar to those that are commercially available with jet defining apertures therein having a diameter of approximately 13 microns. As indicated in FIG. 4, the jet forming apertures of the means 18 and 19 used in the preferred embodiment of the invention are each formed by separate nozzles 18A–18E, etc. that have stream forming apertures therein of about 1 to 3 microns in diameter. In the preferred embodiment of the invention the apertures in the nozzles 18A–18E are each made to be about 1.5 microns in diameter.

The liquid for the jet stream droplets used in this embodiment of the invention is electrically conductive mercury, but it should be understood that other liquids can be used in alternative forms of the invention. Such other liquids may be either electrically conductive or non-conductive because the incoming radiation used to excite a grating made of the droplets will produce sufficiently high fields to coat either kind of droplets with conducting plasma. It will be recognized that an advantage of using conductive liquid to form the droplets 17A and 17B of the grating structure 17 is that electromagnetic resonances will be immediately excited on the droplets when they are impacted by incoming laser light. On the other hand, if non-conductive liquids are used to form the droplets 17A, 17B there will necessarily be some delay between the time such incoming radiation impacts the droplets and the time that a conductive plasma is formed on them. In either case, it should be apparent that the liquid droplets used to form the grating structure 17 are readily disposable.

Figure 5:
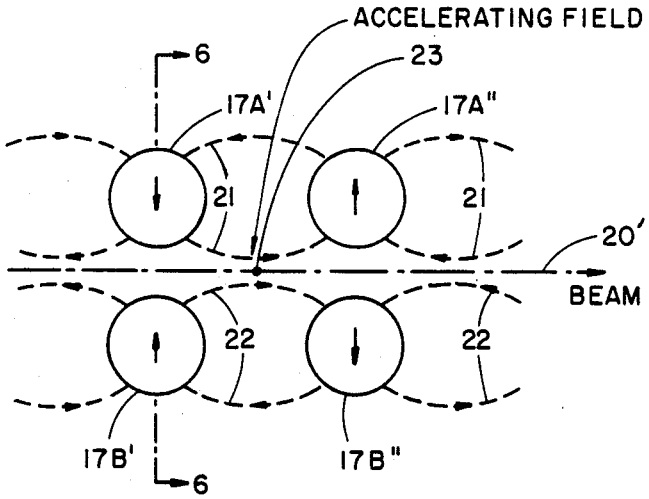
FIG. 5 is a schematic diagram showing, in greatly enlarged form, but not to precise scale, the general relative positions of four of the grating-forming droplets illustrated in FIG. 4, in conjunction with the particle beam path that is bordered by the droplets. Dashed arrows are shown between the droplets to illustrate the electromagnetic resonances excited thereon by the laser light that impacts the droplets when the grating is used as an accelerating or decelerating surface in a particle beam accelerator, such as a linac.

In preliminary tests conducted to prove the operability of an accelerating grating structure composed of a plurality of sphere-shaped surfaces arranged in a row bordering a particle beam path, a prototype grating structure was constructed using two metal spheres that were each approximately 10 cm in diameter. The spheres were positioned between square, electrically conductive metal plates, which acted as mirrors to reproduce fields generally equivalent to an infinite double row of such spheres. With radio frequency radiation incoming on the spheres at a wavelength of about 30 cm, the electromagnetic resonances excited on their surfaces was studied in detail. It was found in those tests that a cavity-liked accelerator solution was developed in which the individual spheres acted approximately like dipole oscillators, each having its direction of polarization facing in toward the axis of the particle beam path bordered by the spheres. It was also found that the accelerating electromagnetic resonances from the two rows of spheres added along the beam path axis to provide the desired acceleration of relativistic particles moving along that path. A schematic illustration of such an arrangement would be analagous to that shown by the orientation of sphere-shaped liquid droplets depicted in FIGS. 5 and 6. Those droplets 17A' are shown bordering a particle beam path designated by the dashed arrow 20', which correlates in its relative position with respect to the beam path used in the tests with the metal-ball prototype, and with the beam path 20 shown in FIG. 4. A second pair of sphere-shaped droplets 17B' and 17B'' are shown in FIG. 5 positioned, respectively, substantially directly below the corresponding droplets 17A' and 17A'', and also bordering the particle beam path 20. The dashed arrows 21 and 22 schematically depict the electromagnetic accelerating resonances that are supported on the surfaces of the spheres 17A', 17A'' and 17B', 17B'' to accelerate particles, such as the charged particle 23 shown in FIG. 6, along the particle beam path 20'.

Figure 6:
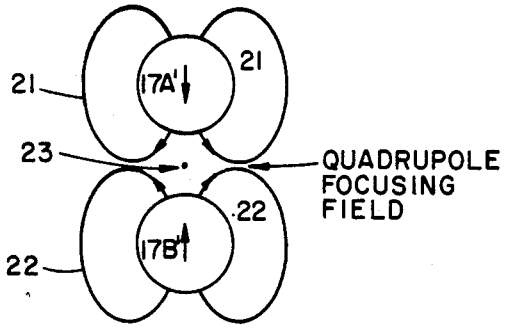
FIG. 6 is an end view, along the planes 6—6 shown in FIG. 5, illustrating the vertical orientation of the excited dipole like droplets forming a portion of the particle accelerating grating structure shown in FIG. 4. The circular arrows coupled to the liquid droplets illustrate the electromagnetic resonances that operate as a quadrupole focusing field surrounding the illustrated particle accelerating beam path that is located midway between the bordering droplets.

The selective, precise positioning of the sphere-shaped droplets according to the invention results in the formation of a quadrupole field for focusing charged particles moving along the beam path, in a manner somewhat like that generally described above, in the background discussion. Such quadrupole field focusing is shown in FIG. 6, where the accelerating electromagnetic resonance fields 21 supported on the surfaces of droplets 17A' and 17A'' operate in conjunction with the accelerating electromagnetic resonance fields 22 supported on the surfaces of the droplets 17B' and 17B''. Thus, a particle 23 moving between the droplets, along the beam path 20' (see FIG. 5) is forced toward a central-axis path between the droplets, so the particles are focused by the quadrupole field surrounding the beam path 20'. Charged particles with Phase T/2 ahead or behind that needed for acceleration will experience the radio frequency quadrupole focusing field.

Figure 7:
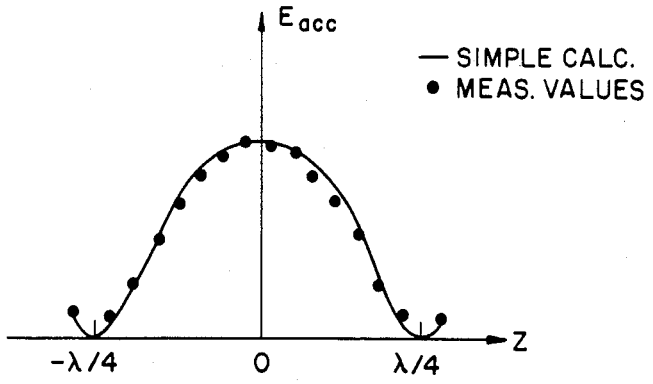
FIG. 7 is a graph showing measured and calculated values for accelerating fields of the type that are produced along the kind of accelerator grating structure shown in FIGS. 4–6.

While using the 10 cm diameter metal spheres and associated conducting plate surfaces of the prototype developed to test the sphere-shaped grating structure principles of the invention, accelerating fields were measured along the axis of a particle beam path. Those measured values were compared with calculated values, using the assumption that the spheres would act as simple dipole accelerators excited with incoming radiation. FIG. 7 shows a plot of both the values in those tests, designated by circles on the graph, and a curve developed by a simple calculation of such values. It is clear from the very good correlation between the calculated values and the measured values, i.e. with the plotted circles all lying close to the curve of calculated values, that an accelerating grating, which uses excited sphere-shaped surfaces to support electromagnetic accelerating resonances, is very well validated.

Although the substantially parallel jet streams of droplets 17A and 17B, are shown in FIG. 4 as positioned in first and second generally planar arrays, with those arrays of streams of droplets being positioned in a desired spaced relationship to one another, such that they border the particle beam path 20 that is positioned between them, it is not immediately apparent (from FIG. 4) that the alternate jet streams in the respective planar arrays 17A and 17B are perturbed or modified slightly in position relative to that generally planar configuration, in order to provide the required coupling of incoming exciting radiation. The illustration of the invention in FIG. 4 is further simplified by depicting the means 24A and 24B used for exciting the grating 17 as substantially vertical beams of laser light. In fact, the perturbed relationship of the jet stream droplets that is required, and the angular orientation of the incoming exciting radiation that is used in the preferred embodiment of the invention, are both more clearly shown in the enlarged schematic illustration of FIG. 8.

Figure 8:
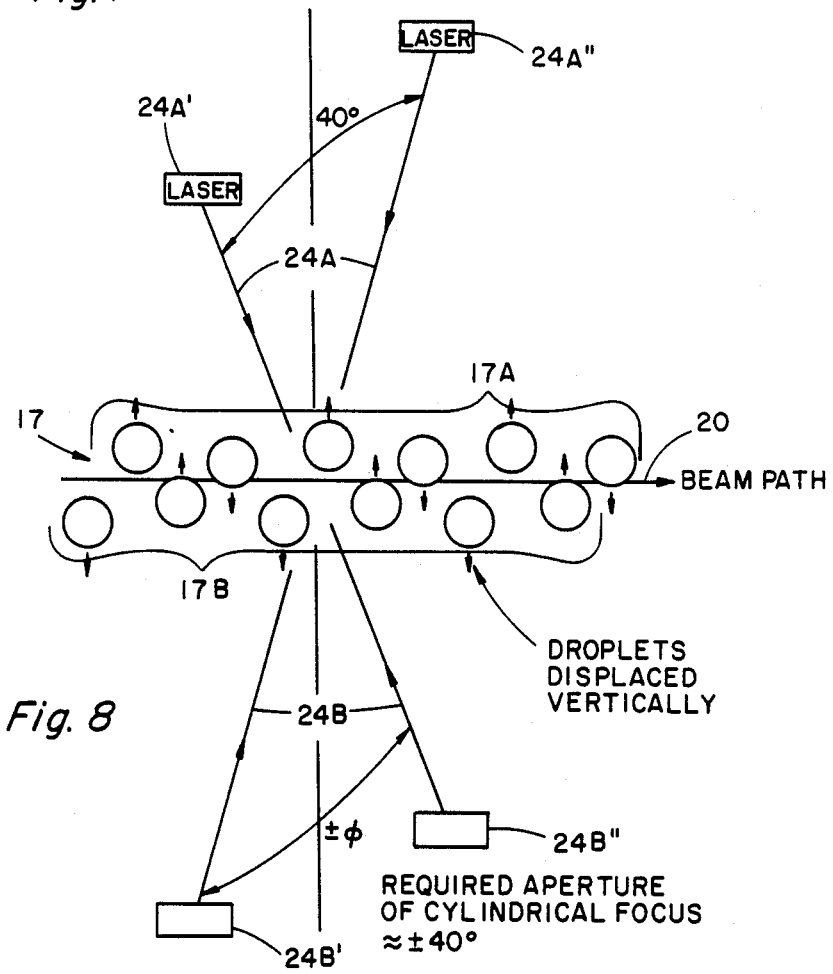
FIG. 8 is a schematic greatly enlarged, side-angle view of a portion of the accelerator grating structure shown in FIG. 4, illustrating in greater detail the modified or perturbed droplet arrangement that is used to effectively couple incoming laser radiation to the grating.

In FIG. 8, as in the other Figs. of the drawing, like numbers are used to designate generally similar components of the invention. Thus, the generally planar arrays of jet streams droplets 17A and 17B are shown positioned, respectively, generally above and below a particle beam path 20. As best seen in FIG. 8, in the preferred embodiment of the invention half of the jet stream droplets in each of the respective arrays 17A and 17B are closer to the particle beam path 20 than the other droplets, by a predetermined distance. In the preferred case being described that predetermined distance is about 0.2 micron closer to the beam path then the remaining jet stream droplets in that array. Moreover, in this embodiment, the jet stream droplets closest to the particle beam path 20 alternate in position with the more distant droplets in its associated array of droplets. This perturbed relationship of the jet stream droplets in the respective arrays 17A and 17B is effective to couple incoming radiation from associated radiation producing means 24A', 24A" and 24B', 24B" that establish a first pair of laser beams 24A, and a second pair of laser beams 24B, which, respectively, intersect each other at a desired predetermined angle. As indicated in FIG. 8, for the preferred embodiment of the invention that predetermined angle of intersection is made to be about 40°. Such a desired orientation of the incoming laser beams is effective to intersect a selected area designated generally by the upper semi-spherical surfaces, or hemispheres, of the respective jet stream droplets in the arrays 17A and 17B, which are directly impacted by the laser beams 24A and 24B, as shown in FIG. 8. Thus, as the jet stream droplets enter that selected area in each of the arrays 17A and 17B, power from the laser beams will be impacted onto the droplets to excite them and cause their surfaces to support electromagnetic resonances that can be used for accelerating charged particles along the particle beam path 20.

Figure 9:
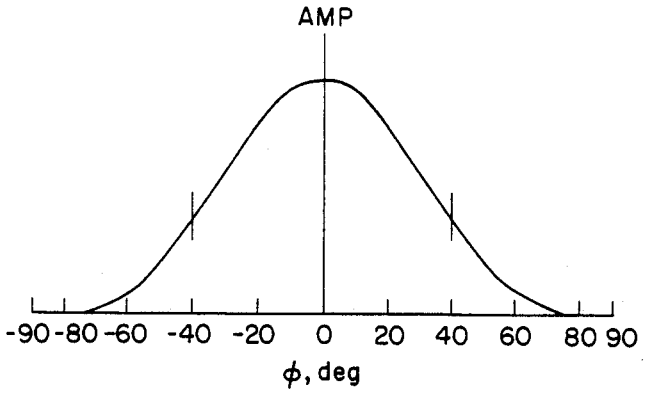
FIG. 9 is a graph showing the azimuthal distribution of incoming laser light that will be 100% coupled to the type of droplet grating structure shown in FIGS. 4 and 8.

Assuming that the sphere-shaped droplets act as dipoles, as shown by the arrows associated with the respective droplets in arrays 17A and 17B, in FIG. 8, it is possible to calculate the azimuthal distribution of incoming radiation from the lasers 24A', 24A" and 24B', 24B" that will most perfectly couple into the required accelerating resonances or modes. The results of such a calculation are shown by the curve of azinuthal distribution of incoming light radiation that will 100% couple to such a droplet structure, as plotted in FIG. 9. This curve turns out to be peeked toward the directions perpendicular to the plane of the particle beam path 20, with a half width at half height of about 35°. Thus, it is apparent that the angular orientation of the incoming laser beams 24A and 24B can be adjusted in alternative arrangements of the invention, to provide a variety of different desired degrees of coupling, and related electromagnetic accelerating resonances for different given applications of the invention. It is only necessary to have the incoming laser beams intersect one another at a suitable predetermined angle. In the preferred embodiment that angle is within the range of 20° to 40°, thereby to afford optimum coupling with the grating.

From the description thus far, it should be understood that an accelerating grating constructed according to the invention may be made of any suitable length, depending only upon the number of generally parallel jet streams that can be provided in the respective planar arrays 17A and 17B for a given application. Likewise, a corresponding variable number of lasers would be needed to excite the jet stream droplets bordering the full length of the particle beam path, depending upon the desired extent of the path.

Figure 10:
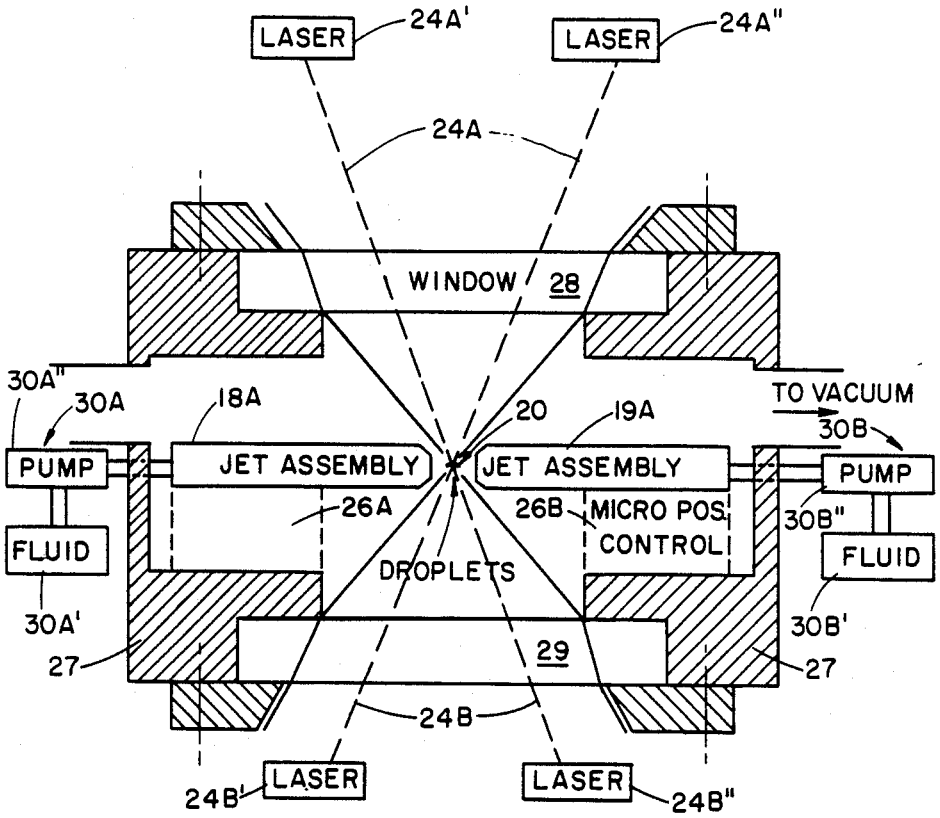
FIG. 10 is a side elevation view, partly in cross section, of an apparatus for readily and efficiently establishing and renewing a disposable accelerator grating structure of liquid droplets constructed according to the invention. The apparatus includes means for pumping jet streams of fluid droplets, on demand, from a connected source of supply fluid. In addition, a plurality of lasers are shown positioned to direct laser beams at predetermined angles with respect to the vertical axis of the disposable accelerator grating, thereby to excite the droplets to support electromagnetic accelerating resonances on their surfaces.

In order to more fully explain such variables and some other structural features of the invention, reference is now made to FIG. 10, wherein the components of the preferred embodiment described thus far are again designated using the same numerals for like components that are shown in the other figures of the drawing. As is well known by those skilled in the design and operation of linacs, it is necessary to provide an evacuated chamber through which a beam of relativistic particles is to be accelerated, along predetermined particle beam path 20, in order to prevent the desired beam from being diffused. Such a vacuum is designated schematically in FIG. 10 by the arrow and "TO VACUUM" label shown to the right of the illustrated structure. Two jet stream droplet forming devices 18A and 19A are mounted on suitable conventional mounting means 26A and 26B, which include suitable conventional micro-positioning control means for accurately positioning the jet stream droplets in the respective desire arrays 17A and 17B, as discussed above. In turn, the jet stream mounting means 26A and 26B are supported on a suitable conventional particle accelerator housing 27, which includes the windows 28 and 29, respectively, at its upper and lower sides, for admitting the laser beams 24A and 24B into the housing 27.

The mounting means and associated micro-position control means 26A and 26B are used to accurately direct jets of droplets streaming from the first plurality of jet forming apertures (18A–18E, as seen in FIG. 4) to form the generally planer array 17A comprising one side of the particle accelerator gratings 17. In the preferred embodiment the jet streams are positioned about 5 microns from one another ±0.2 microns, and about 2.5 microns from the beam path, as shown in FIG. 4. The other supporting means and micro-positioning control 26B is used to direct jets streaming from the second plurality of apertures (shown generally as means 19, in FIG. 4) to form a second generally planer array 17B comprising the other side of the particle accelerator grating 17. Of course, only two of the jet stream droplet forming means 18A and 19A are illustrated in the side elevation view shown in FIG. 10. As mentioned above, to form the very small diameter jet stream droplets desired for the preferred embodiment of the invention, a suitable commercially available ink-jet-printer type of jet stream droplet forming means may be used for the means 18A, 19A, etc. of the preferred embodiment of the invention, provided that the stream-forming-aperture therein is modified in the manner explained above. In the event that additional information is desired concerning such means for producing jet streams of relatively small diameter, reference may be made to an article by E. Bassons, et al. published in *IEEE Transactions* entitled, "Electron Devices" ED-25, pp. 1178 (1978), in which there is described the production of such precision jets having droplet-forming apertures of about 13 microns in diameter. That publication further describes the precision with which the direction of such jets can be angularly positioned to accuracies within one milliradian.

With the preferred embodiment of grating 17 being described, the incoming laser radiation is chosen to have a wavelength of about 10 microns, therefore, it is necessary to form the jet stream droplets, for this preferred embodiment, to have diameters of about 3 microns. The apertures in the jet stream droplet forming means 18A, 19A, etc. must, accordingly, each be made to be about 1.5 microns in diameter. Any suitable conventional means may be used for forming such small apertures in the nozzles of ink-jet-type printers to adapt them for use in practicing the invention. If additional information is desired concerning such means for forming these necessary relatively small apertures, reference may be made to an article entitled, "High Throughput Submicron Lithography With Electron Beam Proximity Printing", by Bohler, et al., in *Solid State Technology*, Vol. 27, pp. 210 (1984).

To force droplets of fluid from the jet stream droplet forming means 18A and 19A, etc., thereby to establish the desired accelerator grating 17, fluid flow control means 30A and 30B are shown in FIG. 10 as including, respectively, suitable conventional sources of fluid 30A' and 30B′ coupled, respectively, as shown by conventional conduit means to respective suitable conventional pumps 30A″ and 30B″, which in turn are coupled by suitable conventional conduit means to the respective jet stream droplet forming means 18A, 19A, etc. In the preferred embodiment of the invention, the sources of fluid 30A′ and 30B′ are filled with mercury but, as mentioned above, water or any other suitable conductive or non-conductive liquid material may be used in practicing alternative arrangements of the invention. Also, in the preferred embodiment being described, the pumps 30A″ and 30B″ are suitable commercially available piezoelectric pumps which can be manually controlled "on demand" to selectively provided pulses of jet stream droplets at irregular intervals, as desired. Alternatively, a suitable conventional control means can be coupled to the pumps 30A″ and 30B″ in order to provide pulses of jet stream droplets at a predetermined desired frequency, thereby to continuously renew the respective arrays 17A and 17B of jet stream droplets forming accelerator grating 17. (As seen in FIG. 4).

In order to produce desirably high gradient electromagnetic acceleration resonance with the droplet grating structure 17 disclosed herein, it will be apparent that a range of different variables can be appropriately adjusted according to the various needs of different applications of the invention. However, it should be understood that a very short pulse of incoming radiation from the lasers 24A′–24A″ and 24B′–24B″, is needed to rapidly generate a suitable plasma, for supporting electromagnetic accelerating resonances on the droplets of arrays 17A and 17B, before the plasma can grow sufficiently to severely distort the original droplet geometry. To accomplish that objective, lasers must be used that will provide a single 10 to 100 millijoule pulse of diffraction limited 10 micron wavelength radiation, with a pulse length of only a few picoseconds. A suitable laser for that purpose, with such desirable characteristics, is described in detail in an article entitled, "High Power, Subpicoseccond 10 Micron Pulse Generation", by P. B. Corkum, in *Optics Letters* 8, pp. 514 (1983). The laser described in that article employs a semiconductor switch to cut a few-picoseconds long micropulse from the otherwise conventional output of the commercially available $CO_2$ laser used. The described switch is operated by a dye laser amplified mode locked 600 micron laser pulse. The 10 micron micro pulse is amplified regeneratively in a 10 atmosphere $CO_2$ gain module to approximately 15 millijoules. In the preferred embodiment of the invention described herein, such a laser should be operated at 60 millijoules, for the case where the incoming laser radiation has a 10 micron wavelength pulsed at about 3 picoseconds, as it is applied to the droplets of approximately 3 microns diameter each in the arrays 17A and 17B of grating 17, (see FIGS. 4 and 10).

For various applications of the accelerator grating 17 of the invention, which could be particularly useful in high energy physics experiments, one would require similarly short pulses but at a high repetition rate (a few kilohertz, for example), and with total power of a few kilojoules per pulse. In order to more specifically identify some suitable parameters for such potential applications, by way of example, for use of a grating accelerator constructed according to the invention in a 5 TeV accelerator application, that would be suitable for use as a collider (two such accelerators would be required, one facing the other), a list of such parameters is presented below in Table I. In this example it is arbitrarily assumed that 150 lasers, each capable of producing 10 joule pulses would be used in preference to utilizing a single 1500 joule laser unit.

TABLE 1

Sample Laser Parameters for Projected High Energy Physics Applications

| | |
|---|---|
| Final beam energy | 5 TeV |
| Accelerator length | 500 meters (× 2 for collider) |
| Accelerated particles per pulse | $4 \times 10^8$ |
| Repetition rate | 3 kilohertz |
| Luminosity (when used as collider) | $10^{33}$ cm$^{-2}$ sec$^{-1}$ |
| Average beam power | 1 M watt (× 2 for collider) |
| Average laser power | 5 M watts (× 2 for collider) |
| Average wall plug power | 50 M watts (× 2 for collider) |
| Number of lasers | 150 |
| Individual laser specifications | |
| Wavelength | 10 microns |
| Power | 10 joules |
| Pulse length | 5 pico seconds |
| Watts | 2 TW |
| Repetition rate | 3 kHz |
| Efficiency | 10% |

It will be recognized that some of the laser parameters, particularly those relating to the stated power levels, may not be practically available for sometime; however, at the present time the conceptual design of such lasers is being actively studied.

From the foregoing description of the invention, it will be apparent that various further modifications and alternative forms of it may be constructed without departing from the teaching or true scope of the invention. Accordingly, it is intended that the limits of the invention be defined by the scope of the following claims.

I claim:

1. A charged particle accelerator grating for accelerating particles along a particle beam path, said grating comprising first and second generally planar arrays of substantially parallel jet streams of droplets, said arrays of droplets being positioned in spaced relationship to one another, thereby to border a particle beam path containing charged particles positioned between said arrays, said beam path also being disposed generally transverse to the jet streams of droplets in both of the arrays, and means for exciting said grating of jet stream droplets to support an electromagnetic resonance thereon that is effective to accelerate charged particles along the beam path responsive to such particles being injected into the path.

2. An invention as defined in claim 1 wherein the jet stream droplets in both of said arrays are effective to support an electromagnetic resonance that is excited on the respective surfaces of said droplets by laser beam radiation of predetermined wavelength impacting on predetermined hemispherical portions of the jet stream droplets.

3. An invention as defined in claim 2 wherein said predetermined wavelength is about 10 microns, and wherein said jets are each formed by a separate nozzle that has a stream forming aperture therein of about 1 to 3 microns in diameter.

4. An invention as defined in claim 3 including pump means for pumping liquid through each said nozzle at a predetermined frequency, thereby to cause the respective apertures in each of said nozzles to form discrete droplets in the jet streams, each of said droplets being within the range of about 2 to 4 microns in diameter.

5. An invention as defined in claim 4 wherein said predetermined frequency is manually regulated, thereby to form said discrete droplets on demand, at a given desired spacing from one another within the jet streams formed by each of said nozzles.

6. An invention as in claim 2 including means for establishing a pair of laser beams that intersect each other at a predetermined angle in the range of about 20° to 40°, and that intersect a selected area of each of said arrays of jet stream droplets, thereby to impart power from the incoming laser radiation to excite the surfaces of the droplets in said selected area of the jet streams and cause electromagnetic accelerating resonances to be supported on the respective droplet surfaces.

7. An invention as in claim 1 wherein said arrays of jet stream droplets are positioned at about equal distances from said particle beam path.

8. An invention as defined in claim 7 wherein said jet streams in each of said arrays are positioned to border the particle beam path at a distance of within about 2.5 microns, ±0.2 microns, from said particle beam path.

9. An invention as in claim 8 wherein half of the jet stream droplets in each of said arrays are closer to said particle beam path by about 0.2 microns than the remaining jet stream droplets in that array, and said closer jet stream droplets alternate in position along the array with the other jet stream droplets of the array, thereby to perturb the periodic geometry of the grating and cause incoming radiation to be efficiently coupled to the grating surface.

10. An invention as defined in claim 7 wherein the jet streams in each of said arrays are spaced from one another by about one-half of the laser radiation wavelength, i.e. at about 5 microns responsive to the incoming radiation wavelength being 10 microns.

11. An invention as defined in claim 6 including means for establishing a second pair of laser beams that intersect each other at a predetermined angle of about 40° and that impact a side of the accelerator grating that is opposite to the side thereof impacted by the first pair of laser beams impacting the grating.

12. An invention as defined in claim 9 wherein said means for exciting the grating of the jet stream droplets includes a first plurality of laser beams directed against the upper surface of the droplets forming the grating, and also includes a second plurality of laser beams directed against the bottom surfaces of the droplets forming the grating, thereby to excite the respective droplets of the grating to support electromagnetic resonances thereon which are effective to focus and accelerate particles moving along the particle beam path.

13. A grating apparatus for a particle beam accelerator or decelerator, said apparatus comprising;

(a) a first jet stream forming means for defining a first plurality of spaced jet stream sizing apertures, (b) a second jet stream forming means defining a second plurality of spaced jet stream sizing apertures, (c) at least one source of fluid, (d) fluid flow control means that are effective to force droplets of fluids from said source of fluid through said first and second pluralities of apertures, thereby to establish a plurality of generally linear jet of droplets, each of said jets streaming outward from a respective related one of said apertures, (e) mounting means for mounting said first jet stream forming means in a predetermined spaced relationship to the second jet stream forming means, thereby to direct jets that stream from said first plurality of apertures to form one side of a particle accelerator grating, and to direct jets that stream from said second plurality of apertures to form a second side of the particle accelerator grating, said one side of the grating being spaced from the second side thereof sufficiently to enable a generally linear beam of particles to be accelerated between and generally parallel to said sides on the grating along a predetermined particle beam path, responsive to charged particles being introduced into said path, and further being responsive to said droplets being made to support electromagnetic resonance thereon by having laser power applied to their surfaces to excite such electromagnetic resonances thereon.

14. An apparatus as defined in claim 13 wherein said source of fluid contains an electrically conductive fluid.

15. An invention as defined in claim 13 wherein the jet streams forming each side of said particle accelerator grating are perturbed to interrupt the periodicity of the sides of the grating sufficiently to cause the incoming radiation impacting the droplets to couple to and support electromagnetic resonance thereon.

16. An invention that is defined in claim 15 wherein the laser power applied to said grating is supplied from a first and second plurality of lasers that are disposed, respectively, above and below the accelerator grating, thereby to excite the surfaces of both the uppermost and lowermost droplets forming said grating.

17. An invention as defined in claim 16 wherein each of said lasers is focused to direct a laser beam at the center of the particle beam path located between the respective sides of the accelerator grating.

18. An invention as defined in claim 15 including means for establishing a pair of laser beams that intersect one another at a predetermined angle, and that intersect a selected area of each of said side of the jet stream grating, thereby to form a plasma of predetermined thickness on the droplets of the grating in said selected area, and to cause the droplets to support electromagnetic resonances thereon that are effective to focus and accelerate charged particles introduced into the particle beam path.

* * * * *